Feb. 12, 1957 W. C. STRUVEN 2,781,448
GATING CIRCUIT
Filed Jan. 26, 1954
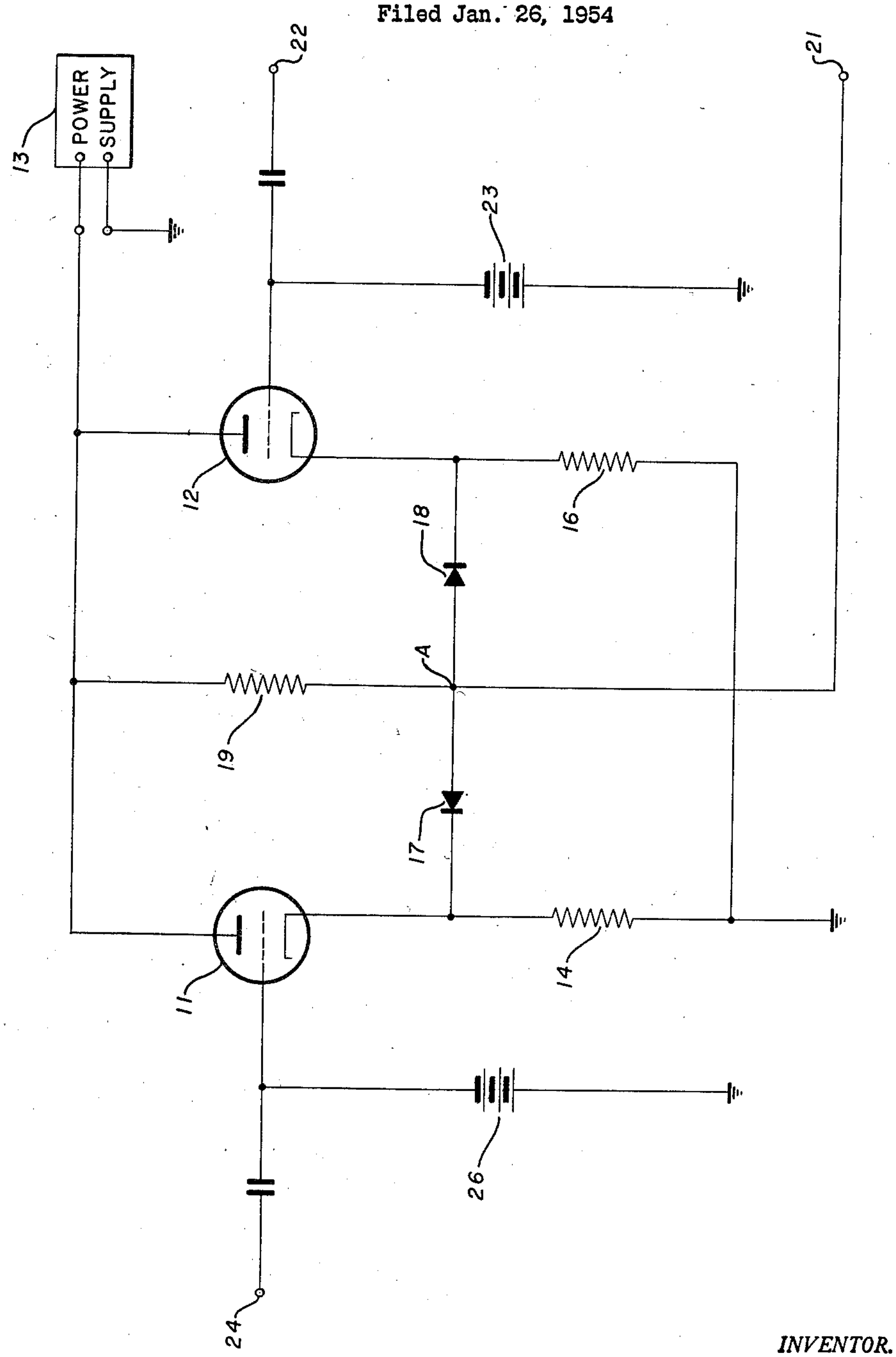
INVENTOR.
WARREN C. STRUVEN
BY
Roland A. Anderson
ATTORNEY.

United States Patent Office 2,781,448

Patented Feb. 12, 1957

2,781,448

GATING CIRCUIT

Warren C. Struven, Berkeley, Calif., assignor to the United States of America as represented by the United States Atomic Energy Commission Application January 26, 1954, Serial No. 406,378

2 Claims. (Cl. 250—27)

The present invention relates to an improved electronic circuit for gating signals or controllably passing same in response to a control or gate signal, and the circuit of the invention contemplates the use of diode elements and in particular crystals, as for example germanium crystals.

Conventional gating circuits employ vacuum tube elements that are triggered or rendered conducting by the application of a gate signal to pass another signal as desired. It is not uncommon for gating circuits to include a large number of circuit components in order to obtain the requisite accuracy and reliability and commonly multielectrode vacuum tubes are employed with a consequently large cost factor. The present invention provides a simplified circuit employing only two conventional triode vacuum tubes in combination with a pair of crystal diodes wherein a relatively few circuit components are employed and all are of low cost. The gating circuit of the invention is thus inexpensive, highly dependable, and easily maintained. Further, the output signals are obtained at a low voltage level so that the utility of the circuit is enhanced.

It is an object of the present invention to provide an improved gating circuit.

It is another object of the present invention to provide a gating circuit having opposed crystal diodes in combination with a pair of vacuum tube control members.

It is yet another object of the present invention to provide a crystal gating circuit having a low voltage level output.

Numerous other possible objects of the invention and advantages thereof will become apparent to those skilled in the art from the following description taken together with the accompanying drawing, wherein the sole figure thereof is a schematic wiring diagram of a single preferred embodiment of the invention.

Considering now the elements and connections of the illustrated embodiment of the invention, there is provided a pair of triode vacuum tubes 11 and 12, each having an anode, cathode, and control electrode. Each of the tubes is energized from an alternating current power supply 13 which has the positive terminal thereof directly connected to the tube anodes, and each of the tubes is connected in cathode following arrangement with load resistors 14 and 16 being connected to the cathodes of tubes 11 and 12, respectively. The two tubes are connected in parallel as regards the power supply 13 and thus the load resistors 14 and 16 are tied together and thence to the negative power supply terminal, a ground return path being illustrated. In addition to the variable impedances, herein shown as vacuum tubes 11 and 12, there are provided a pair of crystal diodes 17 and 18 which are connected in series between the cathodes of the tubes 11 and 12. These crystals may comprise germanium crystals, such as are commercially available, and they are oriented with their directions of maximum conductivity opposing so that crystal 17 adjacent to tube 11 has its direction of maximum conductivity toward the cathode of this tube and crystal 18 adjacent tube 12 has its direction of maximum conductivity toward the cathode of this tube. The crystal diodes 17 and 18 thus have their positive sides joined together, and there is connected between this juncture and the positive terminal of the power supply 13 a resistor 19. Also, connected to the juncture of the crystals 17 and 18 is an output terminal 21 at which appears the gated signal from the circuit.

In addition to the above elements of the circuit, there is provided a control or gating terminal 22 which is connected to the control electrode of the vacuum tube 12 and which is adapted to have impressed thereon a positive control or gating signal. A negative bias is normally applied to tube 12, as by means of a battery 23 connected to the control electrode of the tube 12 for maintaining same at a negative potential with respect to the tube cathode so that the tube is normally nonconducting. Connected to the control electrode of the first vacuum tube 11 is an input terminal 24 which is adapted to receive positive signals to be gated by the circuit. A negative bias source, such as a battery 26, is also connected to the control electrode of the first tube 11 so that this tube is also nonconducting.

With regard to the operation of the invention it will be seen that the bias voltage supplies 26 and 23 normally bias the vacuum tubes 11 and 12 to cut off. In the absence of input or gating signals, the tubes are nonconducting and a small current flows from the power supply 13 through the large resistor 19 and thence to ground through the parallel circuits each including a crystal diode and a cathode follower resistor. The crystal diode resistance is very small for current flow in this direction therethrough and the load resistors 14 and 16 have a relatively low ohmic value so that the majority of the power supply voltage appears across the large resistor 19. The junction point A to which the output terminal 21 is connected, as are the resistor 19 and the positive sides of the diodes 17 and 18, is thus normally maintained at a very low potential, as of the order of five volts for example.

The application to terminal 24 of an input signal of positive polarity and sufficient amplitude to overcome the bias voltage from battery 26 renders tube 11 conducting so that a current flows through the load resistor 14. This current flow increases the voltage drop across the load resistor 14 and raises the potential of the cathode of tube 11 to a higher value than the voltage of point A; however, the potential of point A does not vary as long as the second tube 12 remains nonconducting. The parallel current path from point A to ground through diode 18 and load resistor 16 remains, so that the removal of the other path through diode 17 and resistor 14 does not materially affect the potential of point A insofar as the normal current flow therethrough is concerned. Further, the potential of the negative side of the crystal diode 17 is raised to a higher potential than the positive side by conduction of tube 11 so that current tends to flow backwards through the crystal. In common with conventional crystals of this type, such as germanium crystals, the electrical resistance thereof is very high in the direction opposite to the direction of maximum conductivity so a very high resistance path is provided between the cathode of tube 11 and ground through point A and such a small current flows through this path that it may normally be disregarded. The impression then of input signals of sufficient amplitude to fire the first tube 11 produces no signal at the output terminal 21. Likewise, the impression of a gating signal at terminal 22 in the absence of an input signal at terminal 24 will not produce an output signal for conduction of the second tube 12 and nonconduction of the first tube 11 merely reverses the above situation and does not alter the position or potential of point A.

Direct results obtain from the concurrent application to the circuit of input and gating signals. Thus in the above-described situation wherein an input signal causes the first tube 11 to conduct and raises the cathode potential thereof, the simultaneous application at terminal 22 of a positive gating signal of sufficient amplitude to overcome the negative tube bias causes the second tube 12 to conduct and raises the potential of the cathode thereof in a like manner. With both tubes conducting the tube current of each tube flows through the respective load resistor to increase the potential thereacross and the negative sides of each of the crystal diodes are thus raised to higher potentials than the positive sides. There then remains no low resistance path to ground from point A and variations in conductivity of tube 11, as produced by variations in amplitude of the input signal, produces cathode voltage variations that are transmitted directly to point A and thence to the output terminal 21. The voltage variations of the cathode of tube 11, for example, operate to raise and lower the potential of point A only within the limits that tube 12 is conducting. Thus, if the gate signal has sufficient amplitude to set the tube 12 at a conducting state wherein the tube current passing through the load resistor 16 places the tube cathode at ten volts above ground potential, the resistance of the diode 18 remains high as long as the potential of point A is below 10 volts. Any voltage variation at the cathode of tube 11 which would tend to raise the potential of point A above 10 volts in the example would then reverse the direction of voltage drop across the crystal diode 18 so that the diode resistance would fall to a very low value and current flow therethrough would limit the potential of point A to 10 volts. The circuit will thus be seen to have a limiting function in that the amplitude of the gating signal controls the upper magnitude of the transmitted input signal. The circuit is thus a limiting gate circuit rather than merely an on-off type gating circuit and there is provided at the output terminal a signal proportional to the input signal when the gating signal is applied and within the limits imposed by the gating signal.

What is claimed is:

1. A crystal gating circuit comprising first and second vacuum tubes having cathode follower resistors and negatively biased control means, power supply means connected across each of said tubes whereby same are normally nonconducting, a pair of crystal diodes connected in series between the cathodes of said tubes with their positive sides joined together at an output terminal, a resistor connected between the positive side of said power supply and said output terminal and having an ohmic value greatly in excess of said cathode follower resistors, and an input terminal and a gating terminal connected to the control means of said first and second tubes respectively for impressing positive signals thereon whereby simultaneous input and gating signals produce at said output terminal signals proportionate to said input signals below the value of the gating signal.

2. A crystal gating circuit comprising first and second triode vacuum tubes connected in parallel as cathode followers across a power supply, means normally biasing said tubes to cut-off, a pair of crystal diodes connected in series between the cathodes of said tubes with their positive sides joined and said juncture comprising an output terminal, a large resistor connected between said output terminal and said power supply, an input terminal connected to the grid of said first tube for impressing input signals thereon whereby said tube conducts, and a gating terminal connected to the grid of said second tube for applying thereto gating signals to render said tube conducting whereby concurrent impression of input and gating signals varies the potential of said output terminal in proportion to the input signal within the limits of the gating signal.

References Cited in the file of this patent

UNITED STATES PATENTS 2,538,028 Mozley ---------------- Jan. 16, 1951